(12) United States Patent
Thaly et al.

(10) Patent No.: US 7,317,489 B2
(45) Date of Patent: Jan. 8, 2008

(54) TELETEXT DATA DETECTION BY DATA CONTENT BASED SYNCHRONIZATION AND ERROR REDUCTION

(75) Inventors: Amogh D. Thaly, Caranzalem (IN); Nilesh Bhattad, Nagapur (IN); Rajesh Bhaskar, Kerala (IN); Sudheesh A S, Karnataka (IN)

(73) Assignee: Analog Devices, Inc, Norwood, MA (US)

( * ) Notice: Subject to any disclaimer, the term of this patent is extended or adjusted under 35 U.S.C. 154(b) by 796 days.

(21) Appl. No.: 10/754,784

(22) Filed: Jan. 9, 2004

(65) Prior Publication Data

US 2005/0155085 A1 Jul. 14, 2005

(51) Int. Cl.
*H04N 7/00* (2006.01)
*H04N 11/00* (2006.01)
*H04L 7/02* (2006.01)

(52) U.S. Cl. ............... 348/465; 348/468; 375/360; 375/359

(58) Field of Classification Search ........ 348/465–468, 348/473; 375/355, 359, 360, 317, 319, 365, 375/354, 343
See application file for complete search history.

(56) References Cited

U.S. PATENT DOCUMENTS 5,371,545 A * 12/1994 Tults ..................... 348/465
5,832,045 A * 11/1998 Barber ................... 375/348
7,098,960 B2 * 8/2006 Suzuki et al. ............ 348/465

* cited by examiner

*Primary Examiner*—M. Lee
(74) *Attorney, Agent, or Firm*—Global IP Services, PLLC; Prakash Nama (57) ABSTRACT

A technique to provide a cost effective solution to detect teletext data that can reduce detected error in teletext when the transmission data rate is known. In one example embodiment, this is accomplished by detecting data bits in an unsynchronized digital data stream by finding start of each data bit based on an estimated data bit width and transitions in the unsynchronized digital data stream.

50 Claims, 8 Drawing Sheets

TELETEXT DATA DETECTION BY DATA CONTENT BASED SYNCHRONIZATION AND ERROR REDUCTION

FIELD OF THE INVENTION

The present invention relates to video transmission and, in particular, to teletext data in video transmission.

BACKGROUND OF THE INVENTION

Digital transmission in an analog domain such as video, audio, and microwave frequencies occur serially in time. One such example is teletext data in video transmission.

Teletext transmissions occur at frequencies and/or data rates which are generally known to the receiver. However, during teletext transmission the transmission frequencies can change due to line length variations and/or due to incorrect frequency generation. In addition, during teletext transmission, the terrestrial transmission deteriorates the shape of the analog signal and can be difficult to extract exact digital data, as the sampled analog signal can be in the transition of teletext data bits. For proper detection of teletext data, a prior knowledge and/or accurate estimation of data rate/bit width is required. Further, even if correct estimation of data rate is known in some instances, variations during transmissions can cause errors in detection of frequencies of transmission.

In such situations, the teletext decoder estimates the transmission frequency and passes it on to a detection module. Errors resulting from such estimation of transmission frequencies can require expensive and highly complex decoders, that rely on clock generation synchronized to the teletext data rate and/or phase locked loops that are capable of locking onto the initial synchronizing pattern of the teletext signals, to decode the teletext data.

SUMMARY OF THE INVENTION

A data detection technique for teletext data that relies on slicing and/or edge detecting a video stream bit pattern to estimate a data rate using a higher frequency clock. The estimated data rate/bandwidth as well as data transition points are, then adjusted to correct for error in teletext transmission. In one example embodiment, the date rate is estimated by detecting data bits in an unsynchronized digital data stream by finding start of each data bit based on an estimated data bit width and transitions in the unsynchronized digital data stream. In yet another embodiment, errors in teletext bits are reduced using an adjustable slice level. In yet another embodiment, accumulated samples values for each teletext bit are used to determine and correct teletext bits having error.

DETAILED DESCRIPTION OF THE INVENTION

The present invention provides a cost effective solution to detect teletext data. In addition, the present invention reduces detected error in teletext data when the transmission data rate is known. The detection errors can occur due to channel characteristics, noise, and initial offset in a sampling point. In one embodiment, the detection errors are reduced by dynamically adjusting the sampling point in each detected data bit.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore not to be taken in a limiting sense, and the scope of the present invention is defined only by the appended claims.

Figure 1:
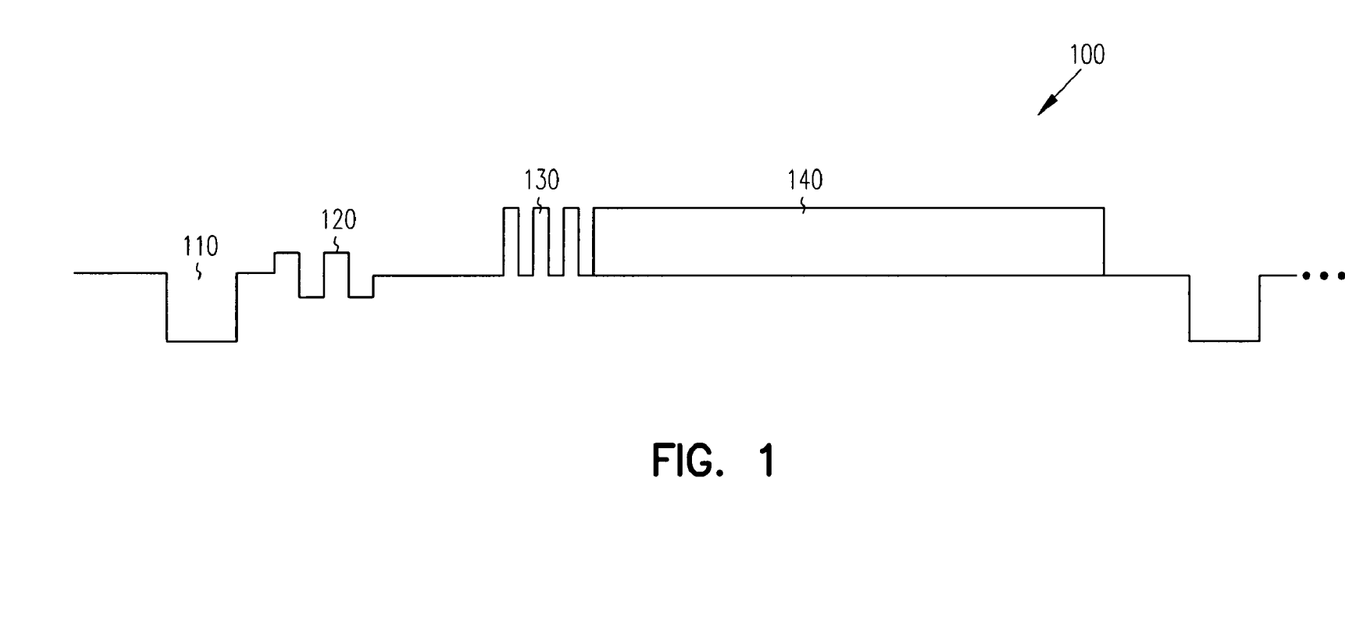
FIG. 1 is a timing diagram illustrating a typical teletext data composition in a teletext data stream.

Referring now to FIG. 1, there is illustrated a timing diagram 100 of a typical teletext data composition during transmission of a teletext signal. As shown in FIG. 1, a typical teletext data composition includes horizontal synchronization (HYSNC) information 110, color burst information 120, data clock run in/synchronizing digital pattern 130, and teletext data 140. It can be seen in FIG. 1 that the data clock run in/synchronizing digital pattern 130 is sent just before the teletext data 140 so that the frequency of transmission of the teletext data 140 as well as the demarcation of the start of the synchronizing digital pattern 130 is known to a receiver, for decoding, before receiving the coded teletext data 140. The data clock run is a synchronizing digital pattern of data bits. In a typical teletext stream, such as the one shown in FIG. 1, the data bits in the synchronizing digital pattern includes a 16 bit stream of alternating 1's and 0's.

Figure 2:
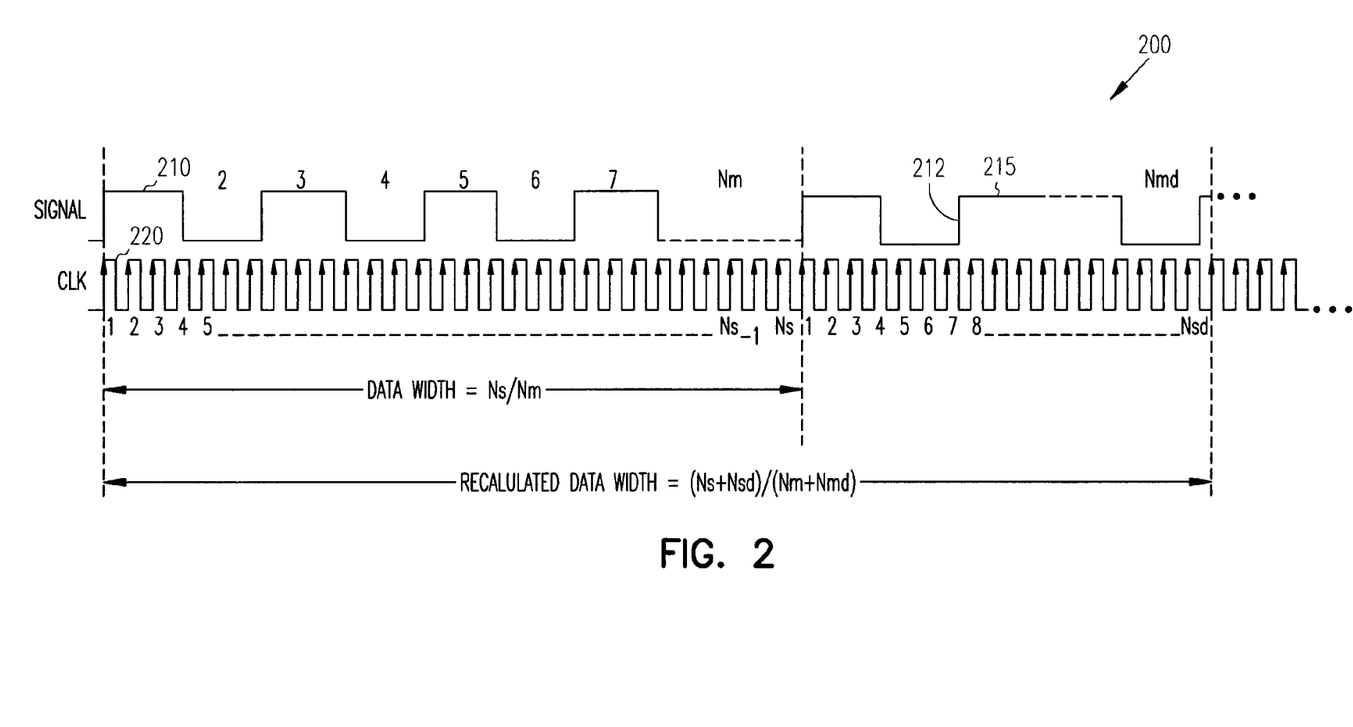
FIG. 2 is a timing diagram illustrating an initial clock estimation process according to an example embodiment of the present invention.

Referring now to FIG. 2, there is illustrated an example timing diagram 200 of an initial clock estimation process. As shown in FIG. 2, the timing diagram 200 illustrates an unsynchronized single bit data stream including a synchronizing digital pattern 210 followed by a binary pattern of a teletext signal 215. Also shown in FIG. 2, is a sampling clock signal 220 having a higher rate than a highest data bit rate detected in the unsynchronized single bit data stream.

In operation, an analog signal including digital data is received by a receiver.

The analog signal can be a video signal or a teletext signal. The received analog signal is then sliced to form the unsynchronized single bit digital data stream shown in FIG. 2. Data bits in the sliced unsynchronized single bit digital data stream is then detected by finding start of each data bit based on an estimated data bit width and transitions in the unsynchronized digital data stream. The transitions in the unsynchronized single bit digital data stream refers to a logic level going from "zero" to "one" or "one" to "zero". In some embodiments, a digitized analog signal including digital data is received. The received digitized analog signal is then digitally sliced to form the unsynchronized single bit serial digital data stream.

In some embodiments, the data bit width is estimated by first counting a number of sampling clock cycles (Ns) and data bits (Nm) detected in the synchronizing digital pattern 210 as shown in FIG. 2. The data bit width is then estimated by using the following equation:

Data bit width=(Ns/Nm)

It can be seen in FIG. 2 that the sampling clock signal 220 has a higher frequency than the highest data bit rate detected in the unsynchronized digital data stream. In some embodiments, the sampling clock frequency used in estimating the data bit width is greater than or equal to twice the highest data bit rate of the unsynchronized digital data stream.

In these embodiments, the received analog signal is then decoded using the estimated data bit width. Each data bit width is considered to be of a value (Ns)/Nm and is decoded by analyzing number of 1's and 0's found in each set of (Ns)/Nm samples.

Figure 3:
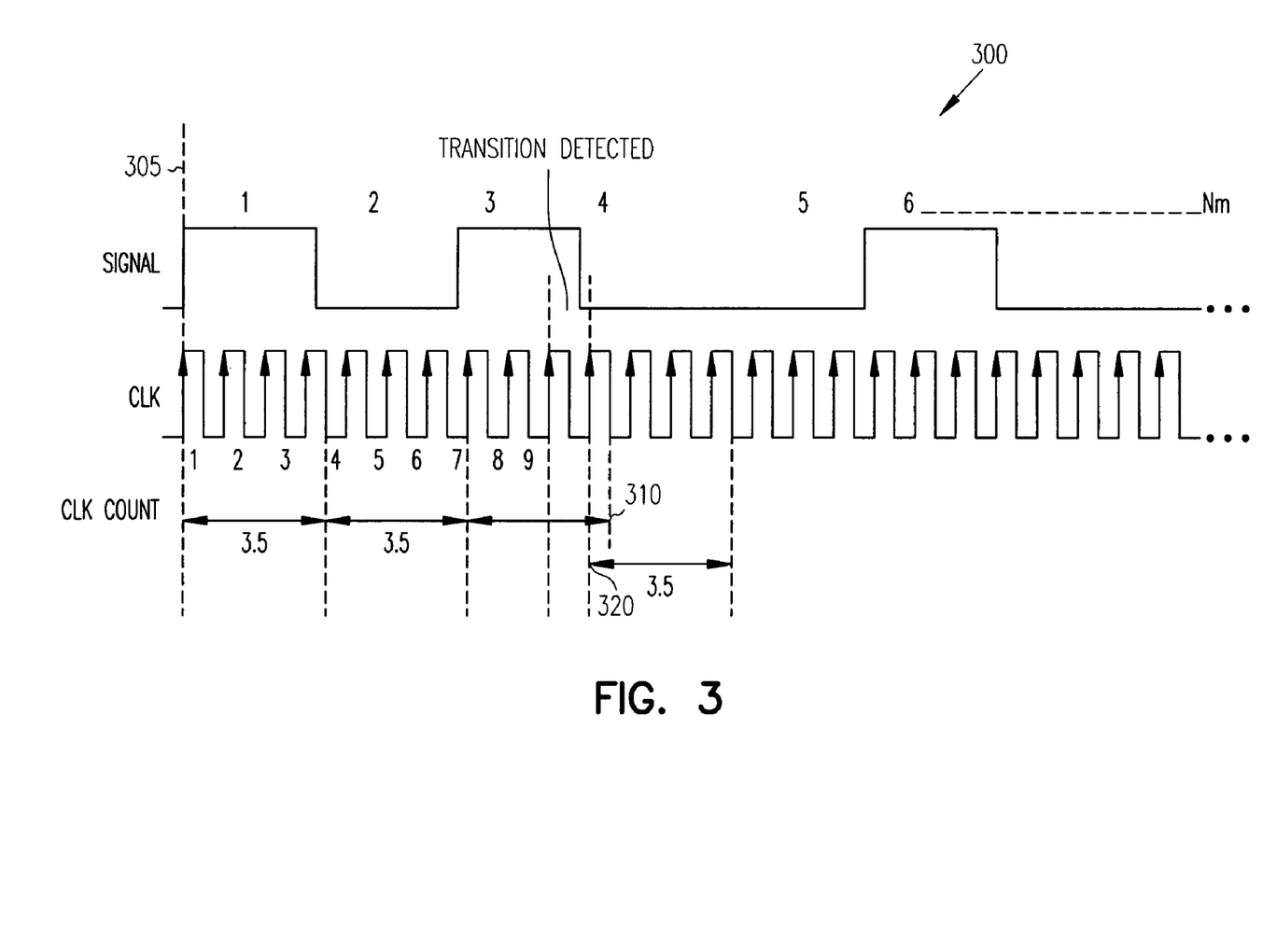
FIG. 3 is a timing diagram illustrating data alignment according to an example embodiment of the present invention.

Also in these embodiments, data bit starting point 212 is adjusted, based on estimating a new data bit width to remove any error generated when estimating the data bit width as shown in timing diagram 300 in FIG. 3, every time a transition is detected in the digital data. This is accomplished by detecting a number of data bits in the initial synchronizing digital pattern and a first transition detected in the digital data. A number of sampling clock cycles is then detected in the initial synchronizing digital pattern and the first detected transition in the digital data. The new data bit width is then estimated using the detected number of data bits, the number of sampling clock cycles in the synchronizing digital pattern and the first transition detected in the digital data, and the computed data bit width.

In some embodiments the new data bit width is estimated, based on finding a transition in the digital data, using the following equation:

New data bit width=(Ns+Nsd)/(Nm+Nmd)

Wherein Nsd corresponds to the number of sampling clock cycles in the initial synchronizing digital pattern and the first detected transition and Nmd corresponds to the number of data bits in the initial synchronizing digital pattern and the first detected transition. The data bits are then detected using the new data bit width.

Referring now to FIG. 3, there is illustrated an example alignment of data bit starting point 320 by adjusting the start of a data bit every time a transition is detected. As shown in FIG. 3, during estimation of the data bit width an error could result due to an offset in the sampling point from the start of the received signal 305 or end of the synchronizing pattern. FIG. 3 shows a technique to remove errors due to data width, i.e., data rate, estimation error.

If the data width estimated initially is Ni clock samples, which means that each bit width is Ni clocks and M bits will be Ni*M clocks wide (a new data bit will start after Ni*M−1 clocks, if there is a data bit change from logic level going from "zero" to "one" or "one" to "zero after Ni*M−1 clocks). Such errors are corrected in the next data bit and each succeeding data bit after the Ni clocks. As shown in FIG. 3, the new data bit stating point 320 is then determined using the new data bit width. The old data bit starting point 310 is then adjusted based on the found new data bit starting point 310 as shown in FIG. 3. The above steps are then repeated every time a new transition is found in the digital data.

For example, in a teletext transmission, each transmitted data word mostly has an odd parity or has at least a single transition from logic level going from "zero" to "one" or "one" to "zero". As the initial fixed synchronizing pattern or clock run-in is sufficiently longer than the highest number of data bits received without a transition from logic level going from "zero" to "one" or "one" to "zero", the problem of accumulated error due to inaccurate data width estimation gets corrected.

Figure 4:
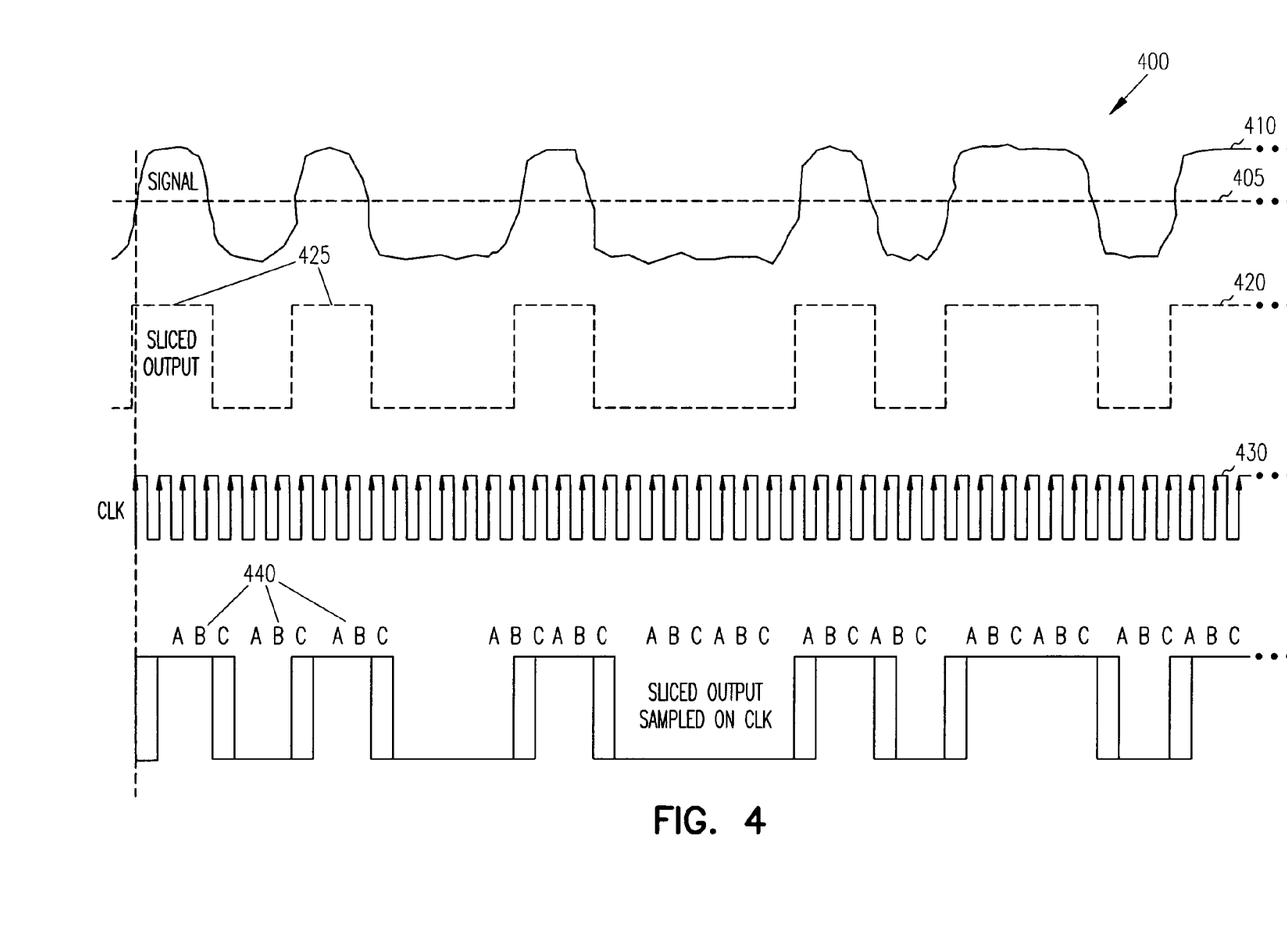
FIG. 4 is a timing diagram illustrating an example technique to reduce errors caused due to degradation of signals in a transmission medium according to the present invention.
Figure 6:
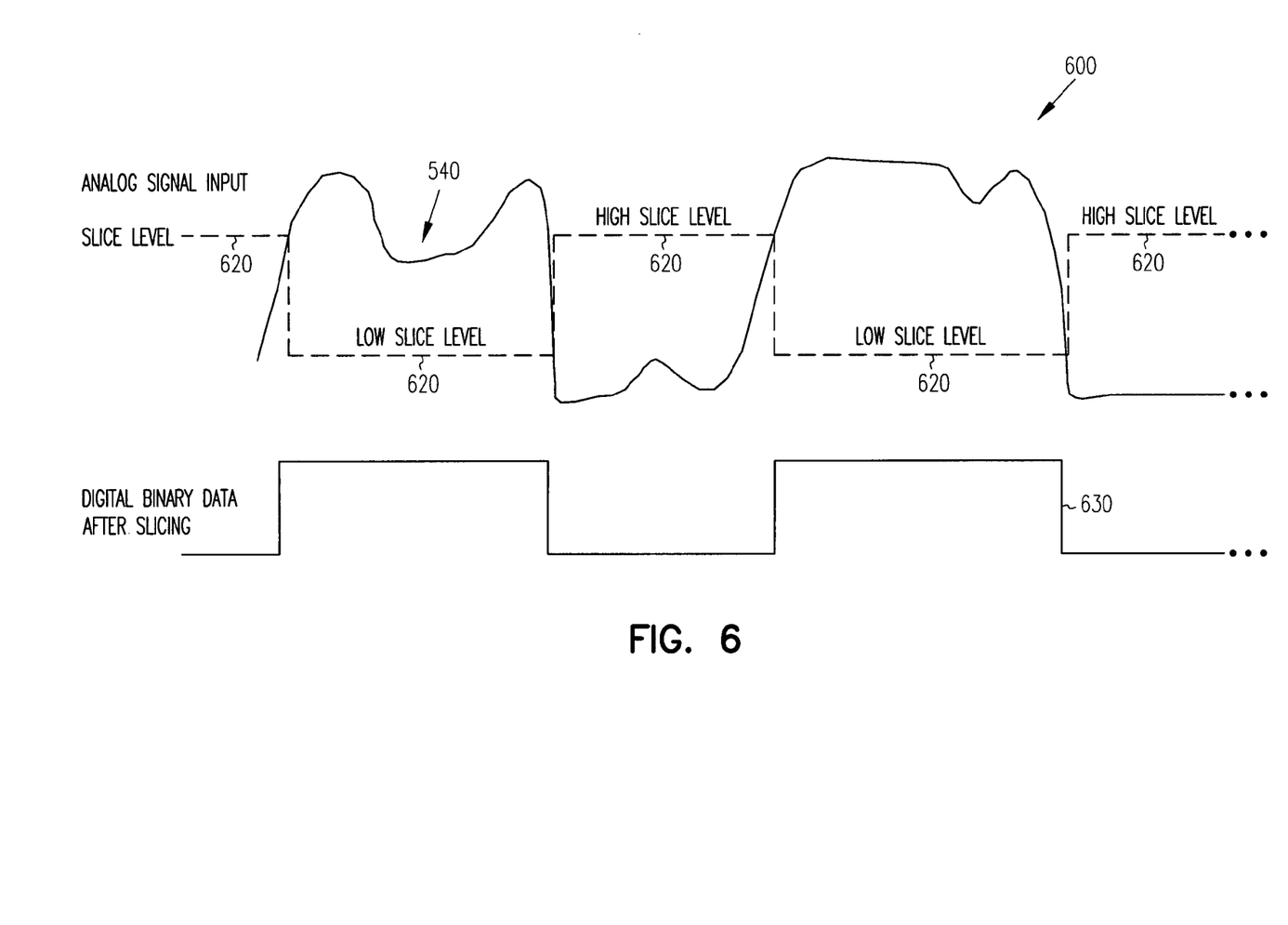
FIG. 6 is a timing diagram illustrating using an adjustable slice level to form a digital data stream.

Referring now to FIG. 4, there is illustrated an example timing diagram 400 of reducing errors resulting from degradation of signals in a transmission medium. The timing diagram 400 illustrates a received degraded analog signal including digital data 410, a degraded single bit serial unsynchronized digital data stream 420 formed by slicing the received analog signal 410 using a fixed slice level 405, a sampling clock signal 430, and the sliced unsynchronized single bit data stream 420 showing selected sample points, such as A, B, and C 440, in each data bit. In some embodiments, the degraded single bit serial unsynchronized digital data stream 420 is formed using an adjustable slice level as shown in FIG. 6.

In operation, a degraded analog signal including digital data 410 is received. The received degraded analog signal 410 is then sliced to form the degraded single bit serial unsynchronized digital data stream 420. Data bits 425 in the single bit serial unsynchronized digital data stream 420 are then detected by synchronizing a first data bit in the single bit serial unsynchronized digital data stream 420 using each of multiple selected sampling points A, B, or C 440 in the first data bit based on a computed data bit width. In some embodiments, the sampling point is computed using a data bit rate and the sampling clock frequency.

Occurrence of a transition for each selected sample point A, B, or C 440 in the first data bit is then detected. The transition detected for each selected sampling point A, B, or C 440 is then accumulated. A sampling clock signal 430, having a higher clock frequency than a highest data bit rate detected in the sliced degraded single bit serial unsynchronized digital data stream 420, is then synchronized to one of the multiple selected sampling points A, B, or C 440 in the first data bit which has a least number of accumulated transitions. In some embodiments, the sampling clock frequency is greater than or equal to the highest data bit rate of the sliced degraded single bit serial unsynchronized digital data stream 420. The above process is then repeated for each subsequent data bit.

Figure 5:
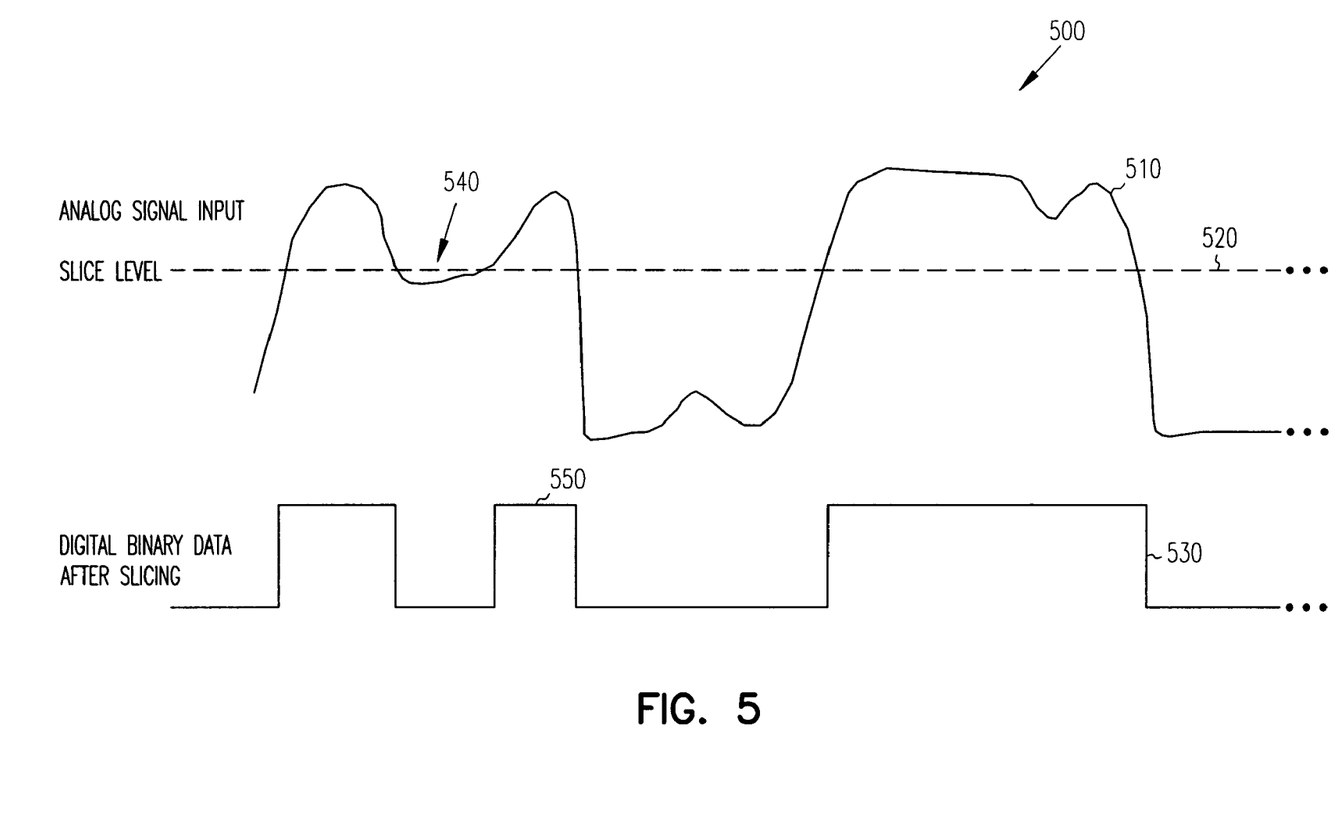
FIG. 5 is a timing diagram illustrating a typical degraded analog signal and its associated digitally sliced analog signal.

Referring now to FIG. 5, there is illustrated an example timing diagram 500 of a typical degraded analog signal 510 received during a teletext transmission. Also, shown in FIG. 5 is a fixed slice level 520 used to form an associated digital data stream 530. Also shown in FIG. 5, is a small change 540 that can occur in the received degraded analog signal 510 due to small transitions, glitches, noise, degradation in transmission, and so on. It can be seen that using the fixed slice level 520, such as the one shown in FIG. 5 can introduce a data detection error around the small change 540 in the degraded analog signal 510 when forming the digital binary data stream 530. For example, the small change 540 in the received degraded analog signal can result in a wrongly decoded teletext data, i.e., can result in a binary bit level change from "0" to "1" or vice versa 550, as shown in FIG. 5.

Referring now to FIG. 6, there is illustrated an example timing diagram 600 using an adjustable slice level to form a digital data stream to improve data detection when data bit rates are known. The timing diagram 600 illustrates the received degraded analog signal including the digital data 510, an adjustable slice level 620, and a degraded single bit serial unsynchronized digital binary data stream 630 formed using the adjustable slice level 620. It can be clearly seen that by using the adjustable slice level 620, the data detection rate can be significantly improved even when there is the small change 540. As shown in FIG. 6, by changing the slice level from a high to low and vice versa whenever the degraded analog signal 510 crosses a previous slice level, the data detection rate can be significantly improved.

Figure 7:
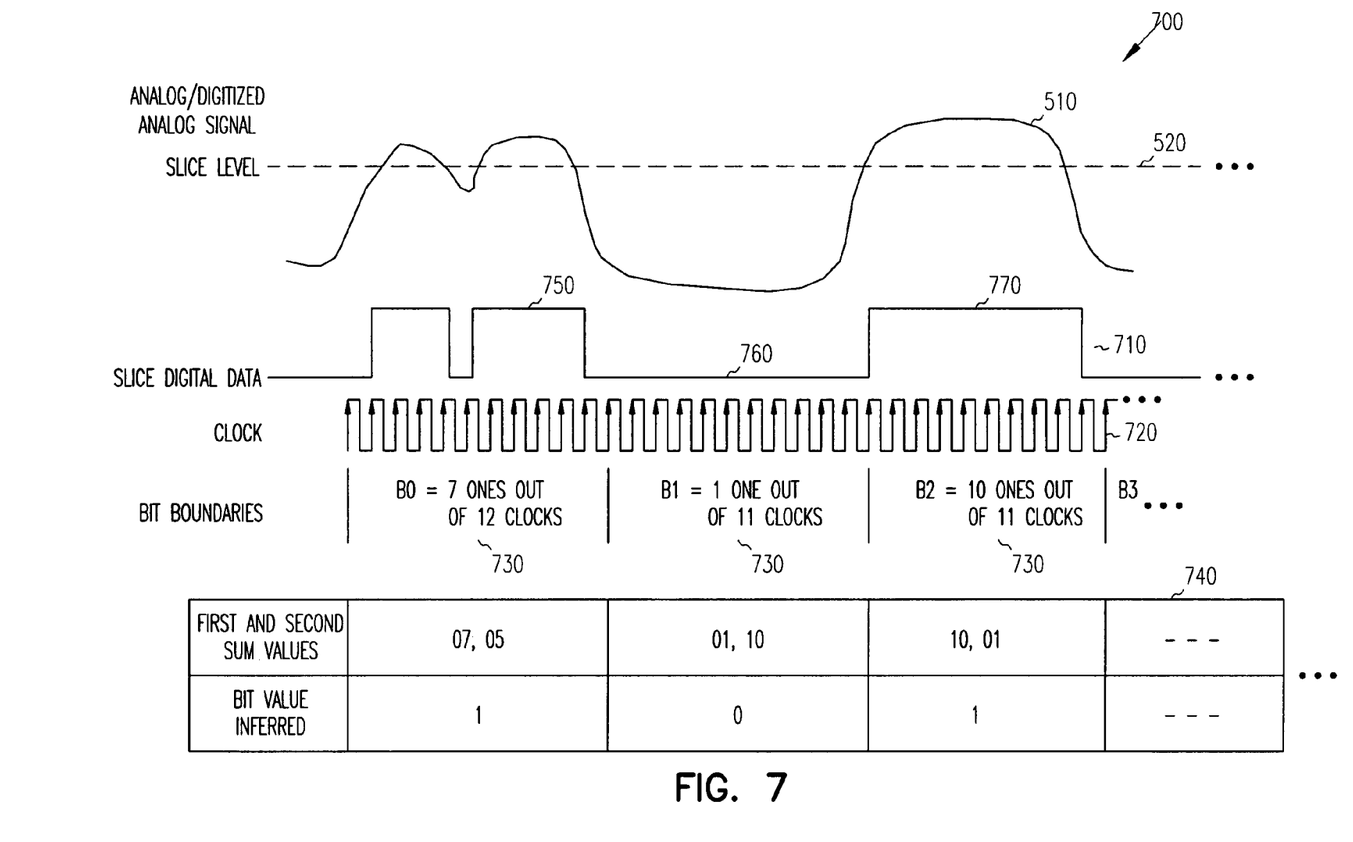
FIG. 7 is a timing diagram illustrating an error detection and correction technique.

Referring now to FIG. 7, there is illustrated an example timing diagram 700 of an error detection and correction technique according to an embodiment of the present invention. The timing diagram 700 illustrates the received degraded analog signal including the digital data 510, a slice level 520 used to form a digital binary data stream, and an associated degraded single bit serial unsynchronized digital binary data stream 710 sliced using the slice level 520. The slice level 520 can be a fixed slice level or an adjustable slice level. Also shown in FIG. 7 are a clock signal 720 and bit boundaries 730. In addition, FIG. 7 shows a table 740 including a determined sum value and an inferred bit value for each teletext bit.

It can be seen in FIG. 7 that a binary sample value of each binary sample in each teletext bit of the sliced digital binary data stream 710 is determined using the clock signal 720 having a higher frequency than a highest data bit rate in the unsynchronized single bit serial digital data stream 710. In this embodiment, the binary sample value of each binary sample is determined at each sampling clock signal in each teletext bit using the sampling clock signal. First and second sum values are then computed by summing the determined one or more binary sample values having similar sample values within each of the teletext bit boundaries 730 as shown in FIG. 7. For example, as shown in FIG. 7, the first and second sum values in a first teletext bit 750 is computed as 7 binary samples having a binary sample value of '1' and 5 binary samples having a binary sample value of '0' in a total of 12 clock signals (i.e., 12 binary samples) within the boundaries 730 of the first teletext bit 750, a second a teletext bit 760 is determined as 1 binary sample having the binary sample value of '1' and 10 binary samples having the binary sample value of '0' in a total of 11 clock signals within the boundaries 730 of the second teletext bit 760, a third teletext bit 770 is determined as 10 binary samples having the binary sample value of '1' and 1 binary samples having the binary sample value of '0' in a total of 11 clock signals within the boundaries 730 of the third teletext bit 770, and so on using the clock signal 720.

One or more candidate teletext bits having an error in each teletext bit are then determined by comparing each of the first and second sum values with a threshold value. The table 740 in FIG. 7 shows the computed first and second sum values as 07 and 05 for the first teletext bit 750, 01 and 10 for the second teletext bit 760, 10 and 01 for the third teletext bit 770, and so on. These values are then compared to the threshold value and the one or more candidate teletext bits having the error are then determined. For example, the first teletext bit having its most uncertain first and second sum values of 07 and 05 among the first, second, and third teletext bits 750, 760, and 770, respectively, is determined as a candidate bit having the error. The first and second sum values of the second and third teletext bits indicate as having a more one sided value and when compared with the threshold value could be inferred as having no errors in the teletext bits. Each of the determined one or more candidate teletext bits having the error in each byte is then compared to one or more parity bits in the associated byte to determine the one or more teletext bits having the error. As shown in FIG. 7, the inferred teletext bit values are '1 0 1' and the determined possible error locations for teletext bits are '1 0 0' in the first, second, and third teletext bits 750, 760, and 770, respectively, where a value '1' here in the error location means that the teletext bit can have an error and is a possible candidate for inversion. The determined teletext bit values are then inverted to correct the error. For example, the first teletext bit 750 having a teletext bit value of '1' is then inverted (based on the one or more parity bits in the byte) to have a corrected teletext bit value of '0'.

In another embodiment, one or more error bits in each byte is detected and corrected by comparing amount of energy in each bit, i.e., the amount of energy above or below a slice level, to a threshold energy level and the one or more parity bits. The bits in each byte are then corrected as a function of the comparison. In these embodiments, an area above or below the slice level is computed. The amount of energy in each bit is then computed as a function of the computed area. The computed amount of energy in each bit is then compared to the threshold energy level and the one or more parity bits to detect the one or more error bits. The bit values in the detected one or more error bits are then inverted to correct the error in the detected one or more error bits.

Figure 8:
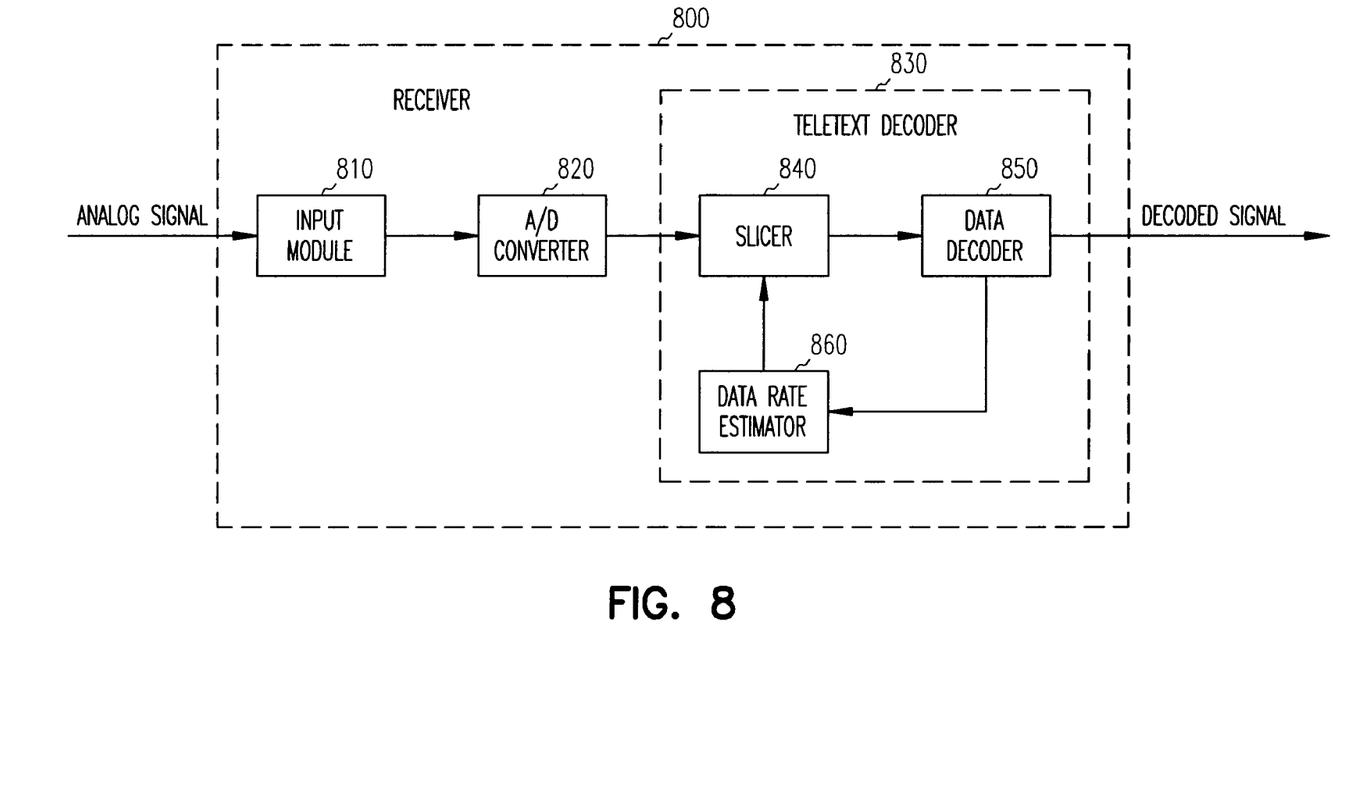
FIG. 8 is a block diagram illustrating an example teletext data detector for implementing embodiments of the present invention.

FIG. 8 is a block diagram illustrating an example receiver of a video transmission system 800. The receiver 800 shown in FIG. 8 illustrates an input module 810, an A/D converter, and a teletext decoder 830. As shown in FIG. 8, the teletext decoder 830 includes a slicer 840, a data decoder 850, and a data rate estimator 860.

In operation, in one example embodiment, the input module 810 receives an analog signal including the digital data. The A/D converter 820 then digitizes the received analog signal including the digital data. The slicer 840 then digitally slices the digitized analog signal to form an unsynchronized single bit serial digital data stream. The digital data includes an initial synchronizing digital pattern followed by digital data. In some embodiments, the slicer 840 uses a fixed slice level as described with reference to FIG. 8 to digitally slice the digitized analog signal to form the unsynchronized single bit serial digital data stream. In other embodiments, the slicer 840 uses an adjustable slice level as described with reference to FIG. 6 to digitally slice the digitized analog signal to form the unsynchronized single bit serial digital data stream.

The data rate estimator 860 detects a number of data bits in the initial synchronizing digital pattern. Also, the data rate estimator 860 detects a number of sampling clock cycles in the initial synchronizing digital pattern. Further, the data rate estimator 860 computes a data bit width by dividing the detected number of data bits by the number of detected sampling clocks. The data decoder 850 then decodes the received digital data using the computed data bit width.

Also in these embodiments, the data rate estimator 860 detects a number of data bits in the initial synchronizing digital pattern and a first transition detected in the digital data. Further, the data rate estimator 860 detects a number of sampling clock cycles in the initial synchronizing digital pattern and the detected first transition in the digital data. Furthermore, the data rate estimator 860 computes a new data bit width using the detected number of data bits and the number of sampling clock cycles, in the initial synchronizing digital pattern and the digital data and the computed data bit width. The data decoder 850 then decodes the digital data using the new data bit width. The computation of the data bit width and the new data bit width is described-above in more detail with reference to FIGS. 1, 2, and 3.

In another embodiment, the data rate estimator 860 detects data bits in the single bit serial unsynchronized digital data stream by synchronizing data bits in the sliced digitized analog signal using each of multiple selected sampling points A, B, or C (shown in FIG. 4) in each data bit based on a data bit width. The data rate estimator 860 then detects occurrence of a transition in each selected sample point A, B, or C 440 of the data bit width. The data rate estimator 860 then accumulates a number of transitions for each selected sample point A, B, or C 440. The data rate estimator 860 then synchronizes the data bits to a sample point having least accumulated number of transitions in each data bit to form synchronized data bits. The data rate estimator 860 then computes the data bit width using the synchronized data bits. Further, the data decoder 850 decodes the synchronized digital data using the computed data bit width. The synchronizing of the data bits in the sliced digitized analog signal is explained above in more detail with reference to FIG. 4.

CONCLUSION

The above-described invention provides an improved solution to detect teletext data. In addition, the above-described invention reduces detected errors in teletext data when the transmission data rate is known. This is achieved by dynamically adjusting the sampling point in each detected data bit.

The various embodiments of the teletext data detection methods described herein are applicable generally to any communication system, and the embodiments described herein are in no way meant to limit the applicability of the invention. In addition, the techniques of the various example embodiments are useful to the design of any hardware implementations of software, firmware, and algorithms. The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A method for decoding digital data in a single bit serial unsynchronized digital data stream, comprising:
    receiving an unsynchronized digital data stream;
    estimating a data bit width, using a sampling clock signal having a sampling clock frequency greater than a highest data bit rate, in the unsynchronized digital data stream; and
    decoding data bits in the digital data using the estimated data bit width.

2. The method of claim 1, wherein the sampling clock frequency is greater than or equal to twice the highest data bit rate in the unsynchronized digital data stream.

3. The method of claim 2, wherein the unsynchronized digital data stream includes an initial synchronizing digital pattern followed by digital data.

4. The method of claim 3, wherein estimating the data bit width comprises:
    counting a number of data bits in the initial synchronizing digital pattern;
    counting a number of sampling clock cycles in the initial synchronizing digital pattern; and
    computing the estimated data bit width using the counted number of data bits and the number of sampling clock cycles in the initial synchronizing digital pattern.

5. The method of claim 4, wherein decoding the data bits in the digital data comprises:
    decoding the data bits in the digital data by using the computed data bit width.

6. The method of claim 5, wherein estimating the data bit width further comprises:
    estimating a new data bit width every time a transition is detected in the digital data.

7. The method of claim 6, wherein estimating the new data bit width comprises:
    detecting a number of data bits in the initial synchronizing digital pattern and a first transition detected in the digital data;
    detecting a number of sampling clock cycles in the initial synchronizing digital pattern and the first detected transition in the digital data;
    estimating the new data bit width using the detected number of data bits and the number of sampling clock cycles in the initial synchronizing digital pattern and the first transition detected in the digital data, and the computed data bit width;
    detecting the data bits in the digital data by using the new data bit width;
    finding a new data bit starting point based on the new data bit width;
    adjusting the old data bit starting point using the found new data bit starting point; and
    repeating the above steps for a next detected transition in the digital data.

8. A method comprising:
    receiving an analog signal including digital data;
    slicing the received analog signal to form the unsynchronized single bit serial digital data stream;
    estimating a data bit width using a sampling clock signal having a sampling clock frequency greater than the highest data bit rate in the unsynchronized digital data stream; and
    detecting data bits in the unsynchronized single bit serial digital data stream by finding start of each data bit based on the estimated data bit width and transitions in the unsynchronized single bit serial digital data stream, wherein each transition comprises a logic level going from "zero" to "one" or "one" to "zero".

9. The method of claim 7, wherein the unsynchronized single bit serial digital data stream includes an initial synchronizing digital pattern followed by digital data.

10. The method of claim 9, wherein, in estimating the data bit width, the sampling clock has a sampling clock frequency greater than or equal to twice the highest data bit rate in the unsynchronized digital data stream.

11. The method of claim 9, wherein slicing the received analog signal to form the unsynchronized single bit serial digital data stream comprises:
    slicing the received analog signal using a fixed slice level to form the unsynchronized single bit serial digital data stream.

12. The method of claim 9, wherein slicing the received analog signal to form the unsynchronized single bit serial digital data stream comprises:
    slicing the received analog signal using an adjustable slice level to form the unsynchronized single bit serial digital data stream.

13. A method comprising:
receiving a digitized analog signal including digital data;
digitally slicing the received digitized analog signal to form an unsynchronized single bit serial digital data stream;
estimating a data bit width using a sampling clock signal having a sampling clock frequency greater than the highest data bit rate in the unsynchronized digital data stream; and
detecting data bits in the unsynchronized single bit serial digital data stream by finding start of each data bit based on the estimated data bit width and transitions in the unsynchronized single bit serial digital data stream, wherein each transition comprises a logic level going from "zero" to "one" or "one" to "zero".

14. The method of claim 13, wherein the unsynchronized single bit serial digital data stream includes an initial synchronizing digital pattern followed by digital data.

15. The method of claim 14, wherein, in estimating the data bit width, the sampling clock has a sampling clock frequency greater than or equal to twice the highest data bit rate of the unsynchronized digital data stream.

16. The method of claim 15, wherein estimating the data bit width comprises:
counting a number of sampling clock cycles found in the synchronizing digital pattern;
counting a number of data bits found in the synchronizing digital pattern; and
calculating the data bit width by dividing the number of sampling clock cycles by the number of data bits.

17. The method of claim 15, wherein detecting the data bits further comprises:
decoding teletext information using the calculated data bit width.

18. The method of claim 15, wherein, in detecting the data bits, the data bit width is calculated for reducing errors caused by degradation of signals to channel characteristics and noise, wherein the errors are selected from the group consisting of an initial offset error and an edge uncertainty error.

19. A method to detect digital data in a degraded single bit serial unsynchronized digital data stream, comprising:
receiving an unsynchronized digital data stream; and
detecting data bits in the unsynchronized digital data stream by finding start of each data bit based on a data bit width and transitions in the unsynchronized digital data stream, wherein the unsynchronized digital data stream includes an initial synchronizing digital pattern followed by digital data, wherein the data bit width is calculated by sampling the initial synchronizing digital pattern and the digital data, and wherein each transition comprises a logic level going from "zero" to "one" or "one" to "zero".

20. The method of claim 19, wherein, in detecting the data bits, the data bit width is calculated by sampling the initial synchronizing digital pattern and the digital data using a sampling clock frequency greater than or equal to twice the highest data bit rate of the unsynchronized digital data stream.

21. The method of claim 20, wherein calculating the data bit width comprises:
computing a number of sampling clock cycles detected in the synchronizing digital pattern;
computing a number of sampling clock cycles detected in the subsequent detected digital data;
computing a number of data bits in the synchronizing digital pattern;
computing a number of data bits in the subsequent detected digital data; and
calculating the data bit width by dividing the sum of the computed number of sampling clock cycles in the synchronizing digital pattern and the detected digital data by the sum of the computed number of data bits in the synchronizing digital pattern and the detected digital data.

22. A method to detect digital data in a degraded single bit serial unsynchronized digital data stream, comprising:
receiving the degraded single bit serial unsynchronized digital data stream;
detecting data bits in the single bit serial unsynchronized digital data stream by synchronizing a first data bit using each of multiple selected sampling points in the first data bit based on a computed data bit width;
detecting occurrence of transitions for each selected sample point in the first data bit;
accumulating a number of transitions detected for each selected sampling point based on the detected transitions in each sample point;
synchronizing a sampling clock signal to one of the multiple selected sampling points in the first data bit which has a least number of accumulated transitions; and
repeating the above steps for a subsequent data bit.

23. The method of claim 22, wherein, in detecting the transitions for each sample point, each transition comprises a logic level going from "zero" to "one" or "one" to "zero".

24. The method of claim 23, wherein the sampling point is computed using a data bit rate and a sampling clock frequency.

25. The method of claim 24, wherein the sampling clock frequency is greater than or equal to twice the highest data bit rate of the unsynchronized digital data stream.

26. A method comprising:
receiving an unsynchronized single bit serial digital data stream, wherein each byte in the unsynchronized single bit serial digital data stream comprises one or more parity bits;
determining a bit value of each teletext bit using a sampling clock signal having a frequency higher than a highest data bit rate in the unsynchronized single bit serial digital data stream;
detecting one or more teletext bits having an error in each byte by comparing each bit value to a threshold value and the one or more parity bit values; and
correcting each teletext bit having the error in each byte as a function of the comparison.

27. The method of claim 26, further comprising:
receiving a digitized analog signal including digital data; and
digitally slicing the received digitized analog signal to form the unsynchronized single bit serial digital data stream.

28. A method comprising:
receiving an unsynchronized single bit serial digital data stream, wherein each byte in the unsynchronized single bit serial digital data stream comprises one or more parity bits;
determining a binary sample value at each sampling clock signal in each teletext bit using the clock signal having the frequency higher than the highest data bit rate in the unsynchronized single bit serial digital data stream; and
computing first and second sum values by summing determined one or more binary samples having similar binary sample values for each teletext bit;

detecting one or more teletext bits having an error in each byte by comparing first and second sum values to a threshold value and the one or more parity bit values; and correcting each teletext bit having the error in each byte as a function of the comparison.

29. The method of claim 28, wherein the binary sampled value comprises values selected from the group consisting of '1' and '0'.

30. The method of claim 29, wherein detecting the one or more teletext bits having the error in each byte by comparing each bit value to the threshold value and the one or more parity bit values comprises:

determining the one or more candidate bits having an error in each byte by comparing each of the computed first and second sum values with the threshold value; and determining one or more teletext bits having the error in each byte by comparing the one or more candidate bits having the error with the one or more parity bits.

31. The method of claim 30, wherein correcting each teletext bit having the error in each byte as a function of the comparison comprises:

inverting the teletext bit values of determined one or more bits having the error in each byte.

32. A method comprising:

receiving a digitized analog signal including digital data, wherein each byte in the received digitized analog signal comprises a plurality of data bits and one or more parity bits;

detecting one or more error bits in each byte by comparing amount of energy in each bit above or below a slice level to a threshold energy level and the one or more parity bits; and correcting the one or more error bits in each byte as a function of the comparison.

33. A method comprising:

receiving a digitized analog signal including digital data, wherein each byte in the received digitized analog signal comprises a plurality of data bits and one or more parity bits;

computing an area above or below the slice level;

computing the amount of energy in each bit as a function of the computed area;

detecting the one or more error bits in each byte by comparing the amount of energy in each bit to the threshold energy level and the one or more parity bits; and correcting the one or more error bits in each byte as a function of the comparison.

34. The method of claim 33, wherein correcting the one or more error bits in each byte as a function of the comparison comprises:

inverting bit values of each determined error bit to correct the detected one or more error bits in each byte.

35. An article comprising:

a storage medium having instructions that, when executed by a computing platform, result in execution of a method comprising:

receiving a single bit serial unsynchronized digital data stream;

detecting data bits in the single bit serial unsynchronized digital data stream by synchronizing a first data bit using each of multiple selected sampling points in the first data bit based on a data bit width;

detecting occurrence of a transition for each selected sample point in the first data bit;

accumulating number of transitions for each selected sampling point based on the detected transitions in each sample point in the first data bit;

synchronizing to one of the multiple selected sampling points in the first data bit which has least accumulated number of transitions; and repeating the above steps for a subsequent data bit.

36. The article of claim 35, wherein, in detecting the transitions for each sample point, each transition comprises a logic level going from "zero" to "one" or "one" to "zero".

37. The article of claim 36, wherein the sampling point is computed using a data bit rate and a sampling clock frequency, wherein the sampling clock frequency is greater than or equal to twice the highest data bit rate of the unsynchronized digital data stream.

38. A receiver comprising:

an A/D converter to digitize an analog signal including digital data; and a teletext decoder to decode the digitized analog signal by detecting data bits in the analog signal by finding start of each data bit based on a data bit width and transitions in the digitized analog signal.

39. The receiver of claim 38, further comprising:

an input module to receive the analog signal including the digital data.

40. The receiver of claim 39, wherein the teletext decoder comprises:

a slicer to digitally slice the digitized analog signal to form an unsynchronized single bit serial digital data stream, wherein the unsynchronized digital data includes an initial synchronizing digital pattern followed by digital data;

a data rate estimator to detect a number of data bits in the initial synchronizing digital pattern, wherein the data rate estimator to further detect a number of sampling clock cycles in the initial synchronizing digital pattern, and wherein the data rate estimator to compute the data bit width by dividing the detected number of data bits by the number of detected sampling clocks; and a data decoder to decode the received digital data using the computed data bit width.

41. The receiver of claim 40, wherein the data rate estimator to detect a number of data bits in the initial synchronizing digital pattern and a first transition detected in the digital data, wherein the data rate estimator to detect a number of sampling clock cycles in the initial synchronizing digital pattern and the detected first transition in the digital data, wherein the data rate estimator computes a new data bit width by using the detected number of data bits and the number of sampling clock cycles in the initial synchronizing digital pattern and the digital data and the computed data bit width, and wherein the data decoder to decode the digital data using the new data bit width.

42. The receiver of claim 40, wherein the data rate estimator determines a bit value of each teletext bit using a sampling clock signal, wherein the data rate estimator detects one or more teletext bits having an error in each byte by comparing each bit value to a threshold value and one or more parity bit values, and wherein the data decoder corrects each teletext bit having the error in each byte as a function of the comparison.

43. A communication receiver comprising:

an A/D converter to digitize a received analog signal including digital data;

a slicer to digitally slice the digitized analog signal to form an unsynchronized single bit serial digital data stream, wherein the unsynchronized digital data includes an initial synchronizing digital pattern followed by digital data;

a data rate estimator to detect data bits in the single bit serial unsynchronized digital data stream by synchronizing data bits in the sliced unsynchronized single bit serial digital data stream using each of multiple selected sampling points in each data bit based on a data bit width, wherein the data rate estimator to detect occurrence of a transition in each selected sample point of the data bit width, wherein the data rate estimator to accumulate a number of transitions for each selected sample point, wherein the data rate estimator to synchronize the data bits to a sample point having a least accumulated number of transitions to form the synchronized data bits, wherein the data rate estimator to compute the data bit width using the synchronized data bits; and a data decoder to decode the unsynchronized single bit serial digital data stream using the computed data bit width.

44. The communication receiver of claim 43, wherein the data rate estimator to compute each sampling point using a data bit rate and a sampling clock.

45. The communication receiver of claim 44, wherein the sampling clock has a frequency greater than or equal to twice the highest data bit rate of the unsynchronized digital data stream.

46. The communication receiver of claim 43, wherein the slicer digitally slices the digitized analog signal to form an unsynchronized single bit serial digital data stream using a slice level selected from the group consisting of a fixed slice level and an adjustable slice level.

47. The communication receiver of claim 46, wherein the data rate estimator detects one or more error bits in each byte by comparing amount of energy in each bit above or below the slice level to a threshold energy level and one or more parity bits, and wherein the data decoder corrects the one or more error bits in each byte as a function of the comparison.

48. An apparatus comprising:

a means to digitize a received analog signal including digital data; and a means to decode the digitized analog signal by detecting data bits in the analog signal by finding start of each data bit based on a data bit width and transitions in the digitized analog signal.

49. The apparatus of claim 48, further comprising:

a means to receive the analog signal including the digital data.

50. The apparatus of claim 48, wherein the means to decode comprises:

a means to digitally slice the digitized analog signal to form an unsynchronized single bit serial digital data stream, wherein the unsynchronized digital data includes an initial synchronizing digital pattern followed by digital data;

a means to detect a number of data bits in the initial synchronizing digital pattern, wherein the data rate estimator to further detect a number of sampling clock cycles in the initial synchronizing digital pattern, and wherein the data rate estimator to compute the data bit width by dividing the detected number of data bits by the number of detected sampling clocks; and a means to decode the detected digital data using the computed data bit width.

* * * * *